(12) United States Patent
Jäppinen

(10) Patent No.: US 6,437,860 B1
(45) Date of Patent: Aug. 20, 2002

(54) METHOD AND APPARATUS FOR ANGLE MEASUREMENT OR TO DEFINE ANGULAR LOCATION OF AN OBJECT

(75) Inventor: Risto Jäppinen, Helsinki (FI)

(73) Assignee: Geopolar Oy, Helsinki (FI)

( * ) Notice: Subject to any disclaimer, the term of this patent is extended or adjusted under 35 U.S.C. 154(b) by 0 days.

(21) Appl. No.: 09/743,875

(22) PCT Filed: Jul. 15, 1999

(86) PCT No.: PCT/FI99/00627

§ 371 (c)(1),
(2), (4) Date: Jan. 17, 2001

(87) PCT Pub. No.: WO00/07034

PCT Pub. Date: Feb. 10, 2000

(30) Foreign Application Priority Data

Jul. 17, 1998  (FI) ................................................. 981630

(51) Int. Cl.⁷ ............................. G01C 3/08; G01C 1/00; G01B 11/26
(52) U.S. Cl. ................................ 356/141.2; 356/141.3; 356/4.08
(58) Field of Search ............................. 356/139.1–143, 356/4.08; 172/4.5

(56) References Cited

U.S. PATENT DOCUMENTS

| | | | | |
|---|---|---|---|---|
| 3,687,556 A | * | 8/1972 | Price et al. ................. | 356/152 |
| 4,136,955 A | * | 1/1979 | Aeschlimann et al. ...... | 356/152 |
| 4,309,758 A | | 1/1982 | Halsall et al. .............. | 364/424 |
| 4,441,809 A | * | 4/1984 | Dudley et al. ................. | 356/1 |
| 4,685,800 A | * | 8/1987 | Paquet ....................... | 356/152 |
| 4,818,107 A | * | 4/1989 | Ono et al. ................... | 356/375 |
| 4,820,041 A | * | 4/1989 | Davidson et al. ............. | 356/1 |
| 4,874,238 A | * | 10/1989 | Ochi et al. .................... | 356/1 |
| 5,100,229 A | * | 3/1992 | Lundberg et al. ............. | 356/1 |
| 5,110,202 A | * | 5/1992 | Dornbusch et al. ........... | 356/1 |
| 5,301,005 A | * | 4/1994 | deVos et al. ................ | 356/141 |
| 5,600,436 A | * | 2/1997 | Gudat ...................... | 356/141.3 |
| 5,898,490 A | * | 4/1999 | Ohtomo et al. .......... | 356/141.3 |
| 6,055,046 A | * | 4/2000 | Cain ....................... | 356/141.1 |
| 6,067,148 A | * | 5/2000 | Kodaira et al. ............ | 356/4.08 |
| 6,104,479 A | * | 8/2000 | Ohtomo et al. ............. | 356/143 |
| 6,172,742 B1 | * | 1/2001 | Yamazaki ................. | 356/4.08 |
| 6,248,989 B1 | * | 6/2001 | Ohishi ........................ | 250/205 |

FOREIGN PATENT DOCUMENTS

| | | |
|---|---|---|
| EP | 0269283 | 6/1988 |
| EP | 0717261 | 7/1996 |
| FI | 93778 | 2/1995 |
| GB | 2152320 | 7/1985 |
| SE | 468332 | 12/1992 |

* cited by examiner

Primary Examiner—Thomas H. Tarcza
Assistant Examiner—Brian K Andrea
(74) Attorney, Agent, or Firm—Reising, Ethington, Barnes, Kisselle, Learman & McCulloch, PC

(57) ABSTRACT

The invention relates to a method and an apparatus for angle measurement or for the determination of an angle of position for an object. The method comprises the use of a beacon having a known position and rotating around its axis, which emits light or reflects light focused thereon. The light emitting from the beacon being determined either previously or for the start of each measurement for a given reference bearing. In the method, the light emitted from the beacon is picked up by a receiver present in an object to be measured, which is provided with elements for determining, by means of the light received from the beacon, the rotational speed of the beacon and further an angular position for the object with respect to said reference bearing. The method is further capable of measuring a distance by using a conventional know base with a receiver at each end, whereby the distance between an object to be measured and the beacon can be determined by working out the triangle or by measuring the peripheral speed between the receivers and by making use of the knowledge about the angular speed of the beacon.

18 Claims, 2 Drawing Sheets

METHOD AND APPARATUS FOR ANGLE MEASUREMENT OR TO DEFINE ANGULAR LOCATION OF AN OBJECT

The present invention relates to a method and an apparatus for angle measurement or for the determination of an angle of position for an object.

An object of the present invention is to provide an improved measuring method and measuring apparatus, wherein the angle measurement functions of a currently used theodolite or tacheometer can be replaced with an apparatus of a simpler technical design, which is moreover reliable in operation and attractive in terms of its price. Another object of the invention is to provide a method and an apparatus, wherein the performance of a measuring process requires one person only.

In order to achieve the above objectives, a method of the invention is characterized in that the method comprises the use of a beacon having a known position and rotating around its axis, which emits light or reflects light focused thereon, the light emitting from the beacon being determined either previously or for the start of each measurement for a given reference bearing, and in which method the light emitted from the beacon is picked up by a receiver present in an object to be measured, which is provided with elements for determining, by means of the light received from the beacon, the rotational speed of the beacon and further an angular position for the object with respect to said reference bearing. On the other hand, an apparatus of the invention is characterized in that the apparatus comprises a beacon rotating around its axis, which is placeable in a known position and which beacon is adapted to emit light or to reflect light focused thereon, the light emitting from the beacon being determined either previously or for the start of each measurement for a given reference bearing, and a receiver placeable in an object to be measured, which is adapted to receive the light emitted from the beacon, said receiver being provided with elements adapted to determine, by means of the light received from the beacon, the rotational speed of the beacon and further an angular position for the object with respect to said reference bearing.

Figure 1:
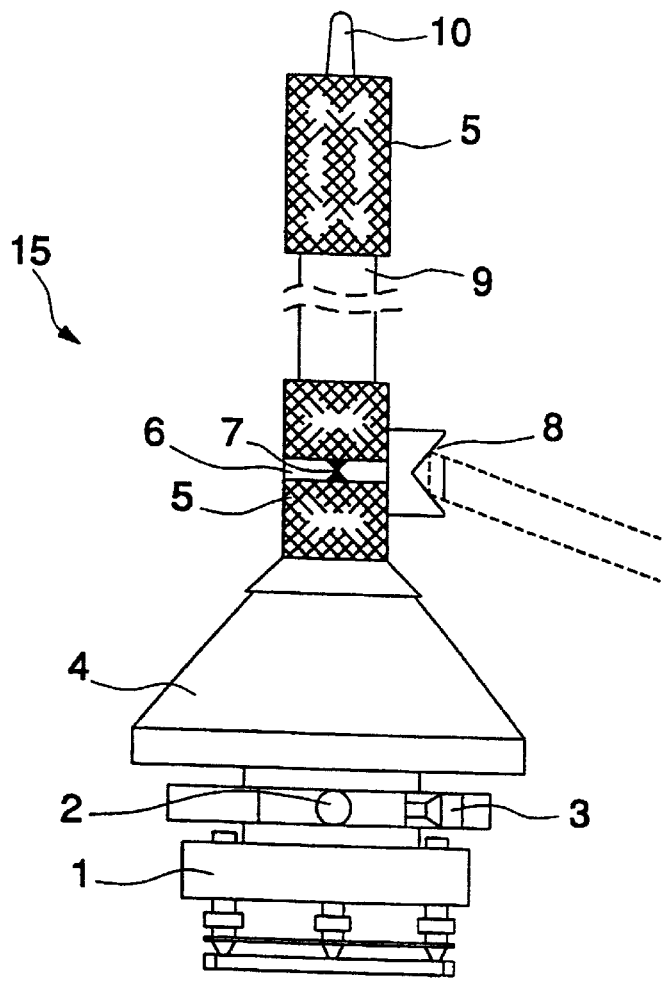
Figure 2:
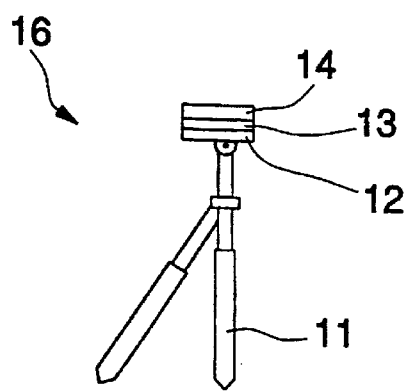
Figure 3:
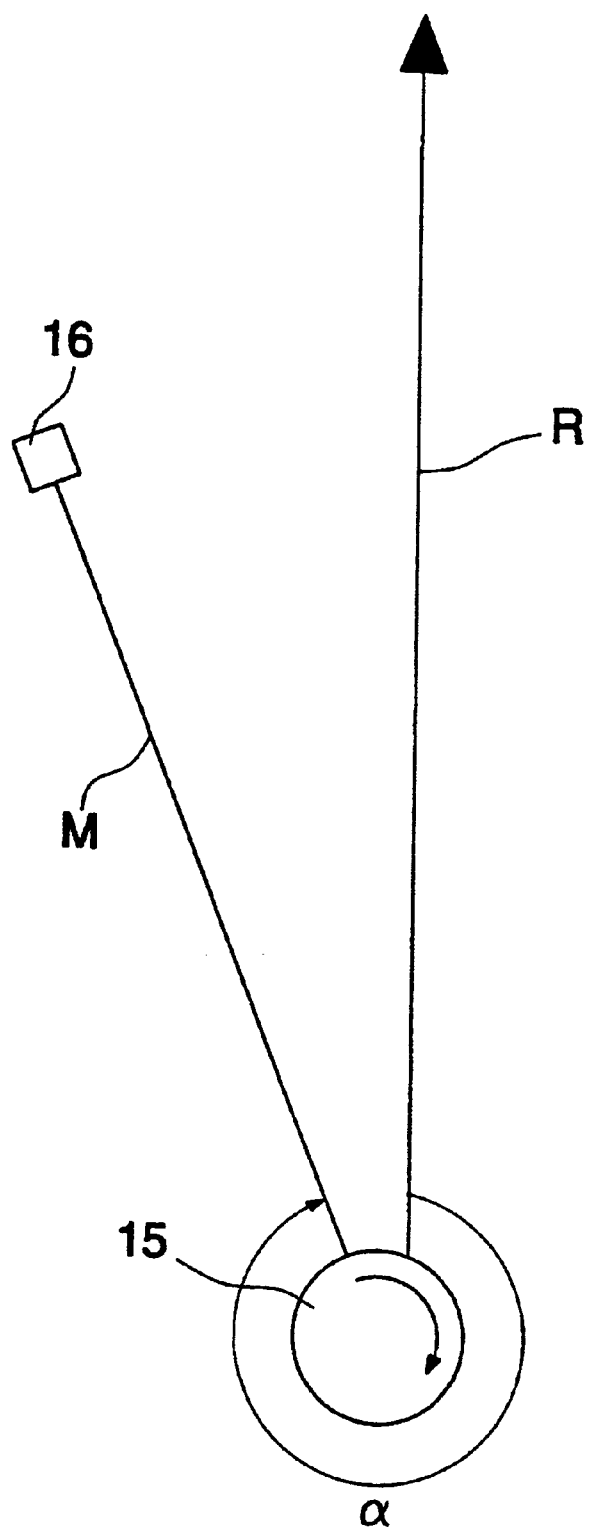

The invention will now be described in more detail with reference to the accompanying drawings, in which:

FIG. 1 shows schematically one exemplary embodiment for a beacon included in an apparatus of the invention, FIG. 2 shows one exemplary embodiment for a receiver included in an apparatus of the invention, and FIG. 3 shows schematically in a plan view the position of an object to be measured relative to a reference bearing.

The embodiment shown in FIGS. 1 and 2 for an apparatus of the invention comprises a beacon 15 adapted to be rotatable around its vertical axis and provided with a balancing bed 1, upon which is mounted a housing 4, enclosing e.g. a motor, a gearshift, and necessary electronics. Above the housing is fitted a measuring rod 9, having its top end provided with an antenna 10. In the depicted embodiment, the measuring rod 9 is provided both in its lower section and its upper section with reflecting surfaces 5, which are intended for an apomecometer included in a receiver 16. The vertical medial area in the reflecting surface 5 of the lower section is provided with a transparent zone 6, which is fitted with the signal light of a null detector. This signal light is used to indicate a full revolution of the beacon and for a zero adjustment of the beacon in a given reference bearing R (FIG. 3), which can be fixed, e.g. a true north or some other predetermined fixed bearing, or which reference bearing R can be re-determnined for the start of each measurement. Alternatively, the antenna 10 can be used for transmitting a time signal about a reference bearing to the receiver by way of a radio. In addition, the lower reflecting surface has its outer face provided with a prismatic reflector 8 for the back-reflection of light focused on the beacon. Moreover, between the housing 4 and the balancing bed I is fitted a locking screw 2 for the beacon alignment as well as a fine adjustment screw 3 for the beacon alignment. By means of the balancing bed 1, the beacon can be set up in a precisely vertical position.

In the depicted embodiment, the receiver 16 comprises a stand 11, having its top end fitted with a schematically illustrated processor and gradometer 12, a light detector 13, as well as an alignment telescope and apomecometer or telemeter 14.

In the illustrated embodiment, the beacon 15 is adapted to rotate around its vertical axis and to emit a light signal, e.g. a vertical line of light, or to reflect light focused thereon. The beacon is set up in a known position or its position can also be determined e.g. by means of satellites included in the GPS system, as the beacon is being erected or thereafter. The beacon can be installed fixedly in position, e.g. for the duration of measurements required at a construction site, and the reference bearing R can also be determined to be fixed, e.g. a true north or some other known direction. The reference bearing can also be determined e.g. for the start of each measurement by positioning the receiver 16 on another known spot, said receiver observing a light signal either emitted by the beacon or emitted by the receiver and reflected back by the beacon. A clock included in the receiver 16 and a processor 12 can use a light signal emitted by the beacon 15 or reflected by the beacon for calculating the rotational speed of the beacon, said rotational speed being converted into desired angular units. The rotational schedule of the beacon, turned into angular units, is then brought to match the angular reading of a known beacon-receiver direction, whereby the receiver can be synchronized with the time of the angular schedule of the beacon. Thereafter, as the receiver 16 is directed to the beacon 15 from any spot to be measured, the light signal emitted or reflected by the beacon uses the clock of the receiver 16 to provide an angular reading which corresponds to the direction beacon-object to be measured (indicated by the letter M in FIG. 3). The apomecometer 14 and the gradometer 12 included in the receiver can be used for measuring the distance and the angle of altitude of an object to be measured with respect to the beacon. Taking into account a bearing measured from the beacon and the height of the beacon, it is possible to calculate x-, y- and z-coordinates for the object to be measured. The use of a receiver provided with a conventional base and two detectors provides a solution, wherein the distance can be determined by working out the triangle or by measuring the peripheral speed between the detectors which, together with the known rotational speed of the beacon, provides the desired distance information. The measurement for a difference in altitude can also be performed as a distance measurement by fitting the beacon with a vertically set measuring rod 9, the distance between the lower and upper reflectors 5 or measuring marks mounted thereon being the dimension necessary for working out the triangle.

FIG. 3 illustrates schematically an implementation of the method. The beacon 15 is first determined for a given reference bearing R, which may be e.g. a true north, whereby, as the beacon 15 is rotating, the receiver 16 present in an object to be measured is informed about a moment the null detector is coincident with the reference bearing R.

Such information can be transmitted to the receiver 16 either as a light signal (as a null detector signal light 7) or a radio signal (the antenna 10). The receiver 16 picks up the light coming from the beacon 15 (either emitted by the beacon or emitted by the receiver and reflected by the beacon) in a direction M, the receiver 16 using its clock and microprocessor to work out the rotational speed of the beacon 15 and to convert the same into desired angular units. A thus determined angular schedule for the beacon can be used for measuring an angular position a for an object to be measured with respect to the reference bearing R in a comparatively simple fashion by means of a measurement of time.

In addition to the above-referred construction site, the method and apparatus of the invention can be used in variety of special applications, e.g. in the survey of power lines and in other applications that require accurate angular/directional measurement. The method is also conceivable for use in connection of level lasers by using a rotating level laser as a beacon.

The apparatus and method of the invention can also be implemented in such a way that the beacon is adapted to rotate around something other than a vertical axis, the angle of position of an object being measurable at different levels perpendicular to said axis of rotation; for example, by adapting the beacon to rotate around a horizontal axis and by using e.g. a horizon level as the reference bearing, the angle of position can be measured in a vertical plane directly by means of a light detector included in the beacon and the receiver without a separate gradometer for an angle of altitude.

What is claimed is:

1. A method for effecting an angle measurement or for the determination of an angle of position for an object, characterized in that the method comprises the use of a single beacon having a known position and rotating around its axis, which emits a single beam of light, the light emitting from the beacon being determined either previously or for the start of each measurement for a given reference bearing (R), and in which method the light emitted from the beacon is picked up by a receiver present in an object to be measured, which is provided with elements for determining, by means of the light received from the beacon, the current rotational speed of the beacon, and in which method the receiver is supplied with information about a moment the beacon is coincident with the reference bearing and about a moment the receiver picks up the light emitted from the beacon, whereby the difference between said moments and said rotational speed of the beacon can be used for determining the angular position for the receiver present in an object with respect to the reference bearing.

2. A method as set forth in claim 1, characterized in that the beacon is installed in the method fixedly in a given position and the reference bearing is determined fixedly in a given direction.

3. A method as set forth in claim 2, characterized in that the beacon (15) is adapted to rotate around its axis and that the fixed reference bearing comprises a horizon level or some other reference plane.

4. A method as set forth in claim 3, characterized in that the beacon (15) is adapted to rotate around its vertical axis and that the fixed reference bearing comprises a true north.

5. A method as set forth in claim 4, characterized in that the method comprises the use of an apomecometer (14) for the determination of site coordinates for an object.

6. A method as set forth in claim 4, characterized in that the method comprises the use of a conventional base with a receiver at each end, whereby the distance between an object to be measured and the beacon can be determined by working out the triangle or by measuring the peripheral speed between the receivers and by making use of the knowledge about the angular speed of the beacon.

7. A method as set forth in claim 4, characterized in that the beacon (15) is adapted to rotate around its vertical axis and that the method further comprises the use of a gradometer (12) mounted on the receiver for the determination of vertical coordinates for an object.

8. An apparatus for the determination of an angle of position for an object, characterized in that the apparatus comprises a beacon rotating around its axis, which is placeable in a known position and which beacon is adapted to emit a single beam of light, the light emitting from the beacon being determined either previously or for the start of each measurement for a given reference bearing, and a receiver placeable in an object to be measured, which is adapted to receive the light emitted from the beacon, said receiver being provided with elements adapted to determine, by means of the light received from the beacon, the current rotational speed of the beacon and further an angular position ($\alpha$) for the object with respect to said reference bearing.

9. An apparatus as set forth in claim 8, characterized in that said elements of the receiver (16) include a light detector (13), a clock, and a microprocessor (12).

10. An apparatus as set forth in claim 9, characterized in that said elements of the receiver (16) further include an apomecometer (14) and a gradometer (12) for an angle of altitude.

11. A method as set forth in claim 10, characterized in that the beacon is adapted to rotate around its axis and that the fixed reference bearing comprises a horizon level or some other reference plane.

12. A method as set forth in claim 11, characterized in that the beacon is adapted to rotate around its vertical axis and that the fixed reference bearing comprises a true north.

13. A method as set forth in claim 12, characterized in that the method comprises the use of an apomecometer for the determination of site coordinates for an object.

14. A method as set forth in a claim 12, characterized in that the method comprises the use of a conventional base with a receiver at each end, whereby the distance between an object to be measured and the beacon can be determined by working out the triangle or be measuring the peripheral speed between the receivers and by making use of the knowledge about the angular speed of the beacon.

15. A method as set forth in claim 12, characterized in that the beacon is adapted to rotate around its vertical axis and that the method further compris4s the use of a gradometer mounted on the receiver for the determination of vertical coordinates for an object.

16. A method as set forth in claim 1, characterized in that the method comprises the use of an apomecometer for the determination of site coordinates for an object.

17. A method as set forth in a claim 1, characterized in that the method comprises the use of a conventional base with a receiver at each end, whereby the distance between an object to be measured and the beacon can be determined by working out the triangle or be measuring the peripheral speed between the receivers and by making use of the knowledge about the angular speed of the beacon.

18. A method as set forth in claim 1, characterized in that the beacon is adapted to rotate around its vertical axis and that the method further comprises the use of a gradometer mounted on the receiver for the determination of vertical coordinates for an object.

* * * * *

UNITED STATES PATENT AND TRADEMARK OFFICE
CERTIFICATE OF CORRECTION

PATENT NO. : 6,437,860 B1
DATED : August 20, 2002
INVENTOR(S) : Risto Jäppinen

It is certified that error appears in the above-identified patent and that said Letters Patent is hereby corrected as shown below:

Column 1,
Line 5, insert the heading -- TECHNICAL FIELD --;
Line 8, insert the heading -- BACKGROUND OF THE INVENTION --;
Line 17, insert the heading -- SUMMARY OF THE INVENTION --;
Line 42, insert the heading -- BRIEF DESCRIPTION OF THE DRAWINGS --;
Line 50, insert the heading -- DETAILED DESCRIPTION OF THE PREFERRED EMBODIMENT --;

Column 3,
Line 10, delete "a" and insert -- $\alpha$ --;

Column 4,
Line 44, after "or" delete "be" and insert -- by --;
Line 49, delete "compri4s" and insert -- comprises --;
Line 59, delete "be" and insert -- by --.

Signed and Sealed this

Twenty-fifth Day of February, 2003

JAMES E. ROGAN
*Director of the United States Patent and Trademark Office*